US009856090B1

(12) United States Patent
Massey, Jr.

(10) Patent No.: US 9,856,090 B1
(45) Date of Patent: Jan. 2, 2018

(54) CONVEYOR TRACK ASSEMBLY FOR A MECHANICAL CHAIN

(71) Applicant: George W. Massey, Jr., Edisto, SC (US)

(72) Inventor: George W. Massey, Jr., Edisto, SC (US)

( * ) Notice: Subject to any disclaimer, the term of this patent is extended or adjusted under 35 U.S.C. 154(b) by 0 days.

(21) Appl. No.: 15/666,818

(22) Filed: Aug. 2, 2017

(51) Int. Cl.
*B65G 15/60* (2006.01)
*B65G 21/22* (2006.01)
*B65G 17/26* (2006.01)
*B65G 21/20* (2006.01)

(52) U.S. Cl.
CPC ............. *B65G 21/22* (2013.01); *B65G 17/26* (2013.01); *B65G 2812/02019* (2013.01)

(58) Field of Classification Search
CPC ........ B65G 21/02; B65G 21/20; B65G 21/06; B65G 15/62; B65G 15/60; B65G 15/64
USPC ...................................... 198/837, 841, 860.1
See application file for complete search history.

(56) References Cited

U.S. PATENT DOCUMENTS

| | | | | | |
|---|---|---|---|---|---|
| 3,856,133 | A | * | 12/1974 | Dyachkov | B65G 39/12 198/825 |
| 6,330,147 | B1 | * | 12/2001 | Adams | G06F 1/184 361/679.37 |
| 7,011,208 | B2 | * | 3/2006 | Nakashima | B65G 15/64 198/840 |
| 7,971,707 | B2 | * | 7/2011 | Elsner | B65G 21/22 198/841 |
| 2004/0216987 | A1 | * | 11/2004 | Wiggins | B65G 15/62 198/841 |
| 2014/0116850 | A1 | * | 5/2014 | Musick | B65G 17/086 198/617 |
| 2014/0367228 | A1 | * | 12/2014 | Laverdiere | B65G 15/62 198/831 |
| 2017/0146135 | A1 | * | 5/2017 | Arora | F16K 3/14 |

* cited by examiner

*Primary Examiner* — James R Bidwell
(74) *Attorney, Agent, or Firm* — Dority & Manning, P.A.

(57) ABSTRACT

A conveyor track assembly section for a mechanical chain comprises a base plate, a wear track profile and a z-spring. The z-spring comprises a first arm, a second arm, and a third arm, in which the first arm, the second arm, and the third arm form a Z shape, and the z-spring is used to secure the wear track profile to the base plate. The mechanical chain is received within the wear track profile. A conveyor track assembly section may further comprise a plurality of placement pins and a plurality of z-springs to secure and align the wear track profile and the base plate. Multiple conveyor track assembly sections may be assembled together to form a conveyor track assembly for the mechanical chain.

20 Claims, 8 Drawing Sheets

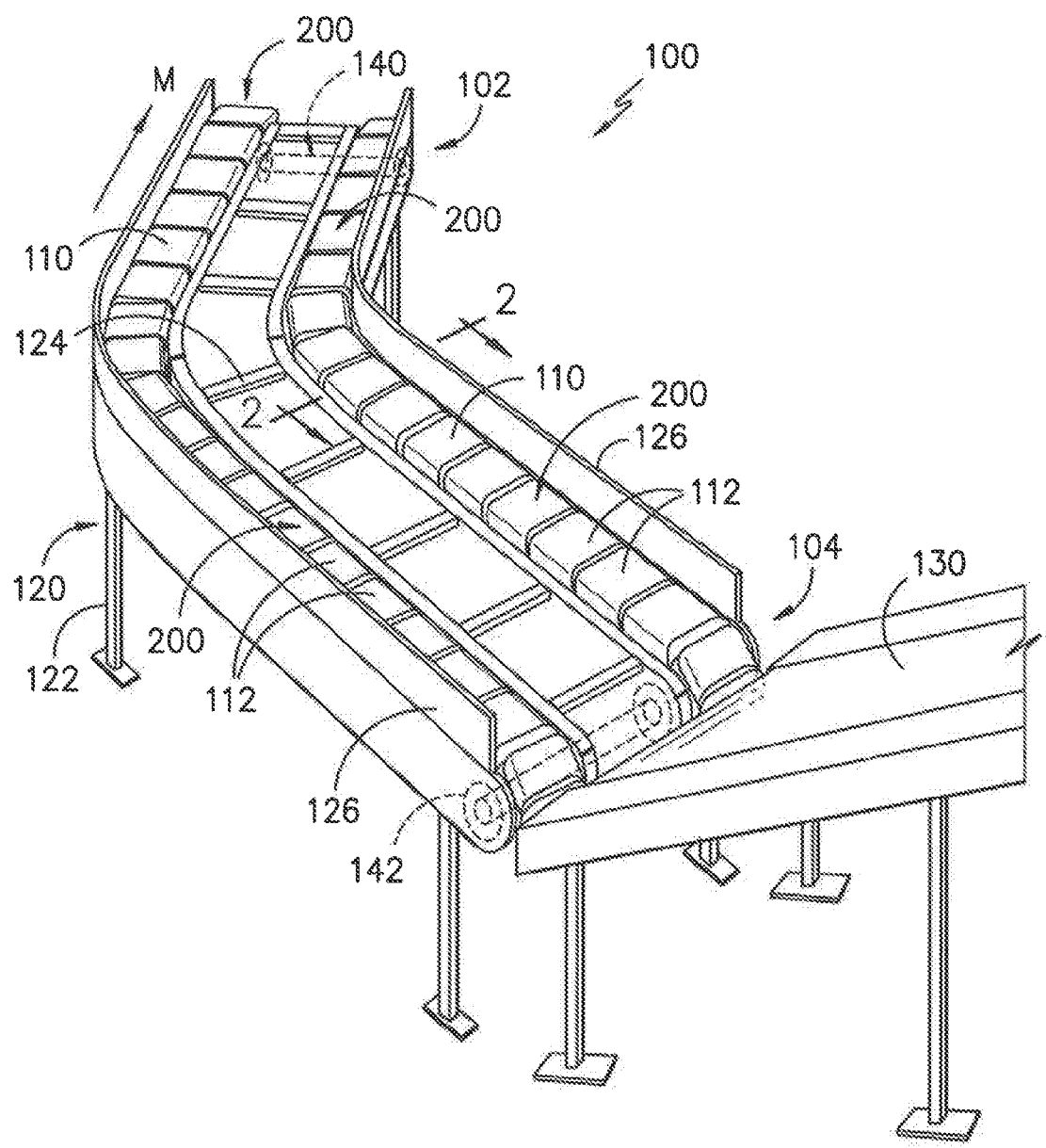
FIG. -1-

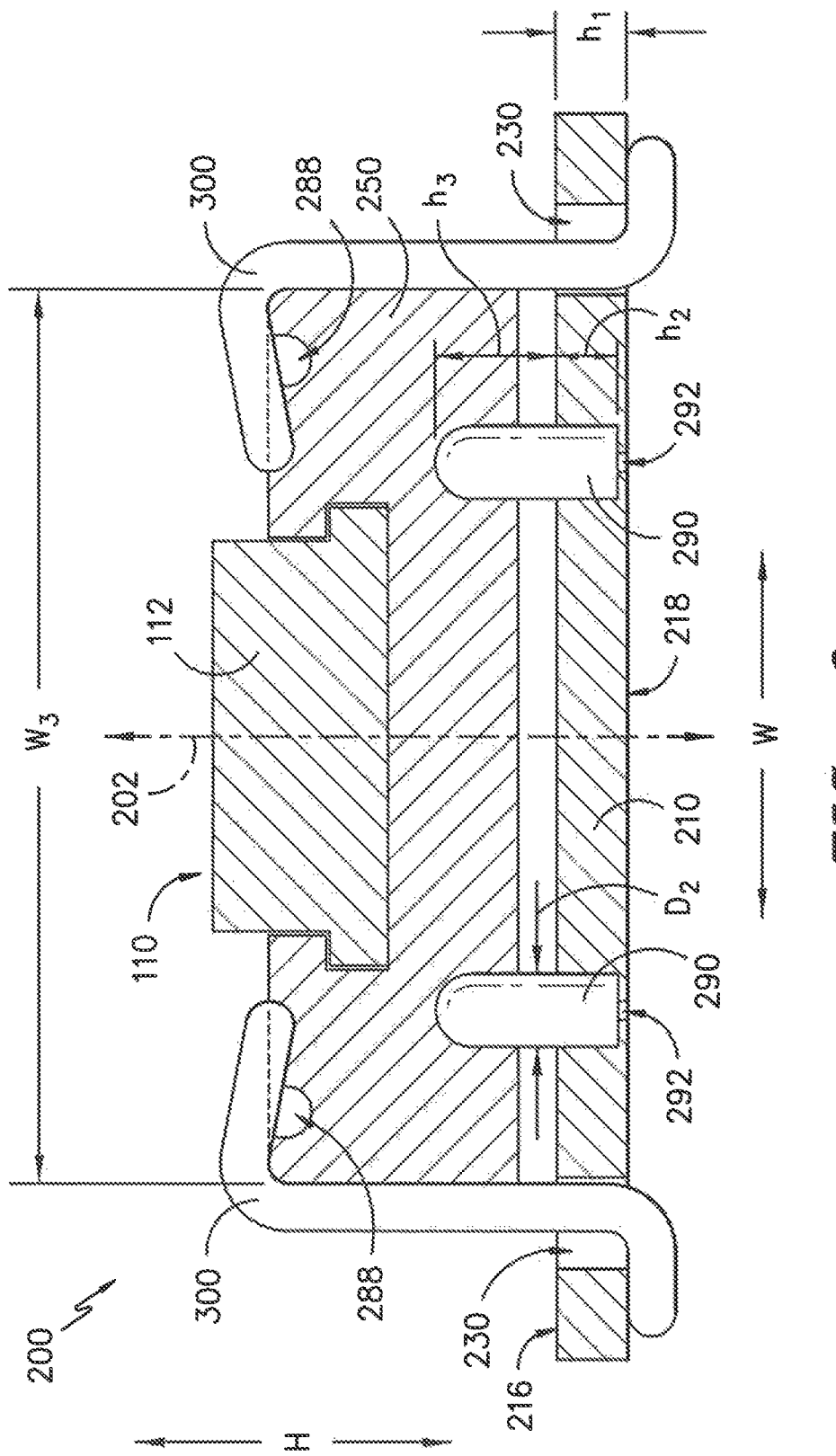
FIG. -2-

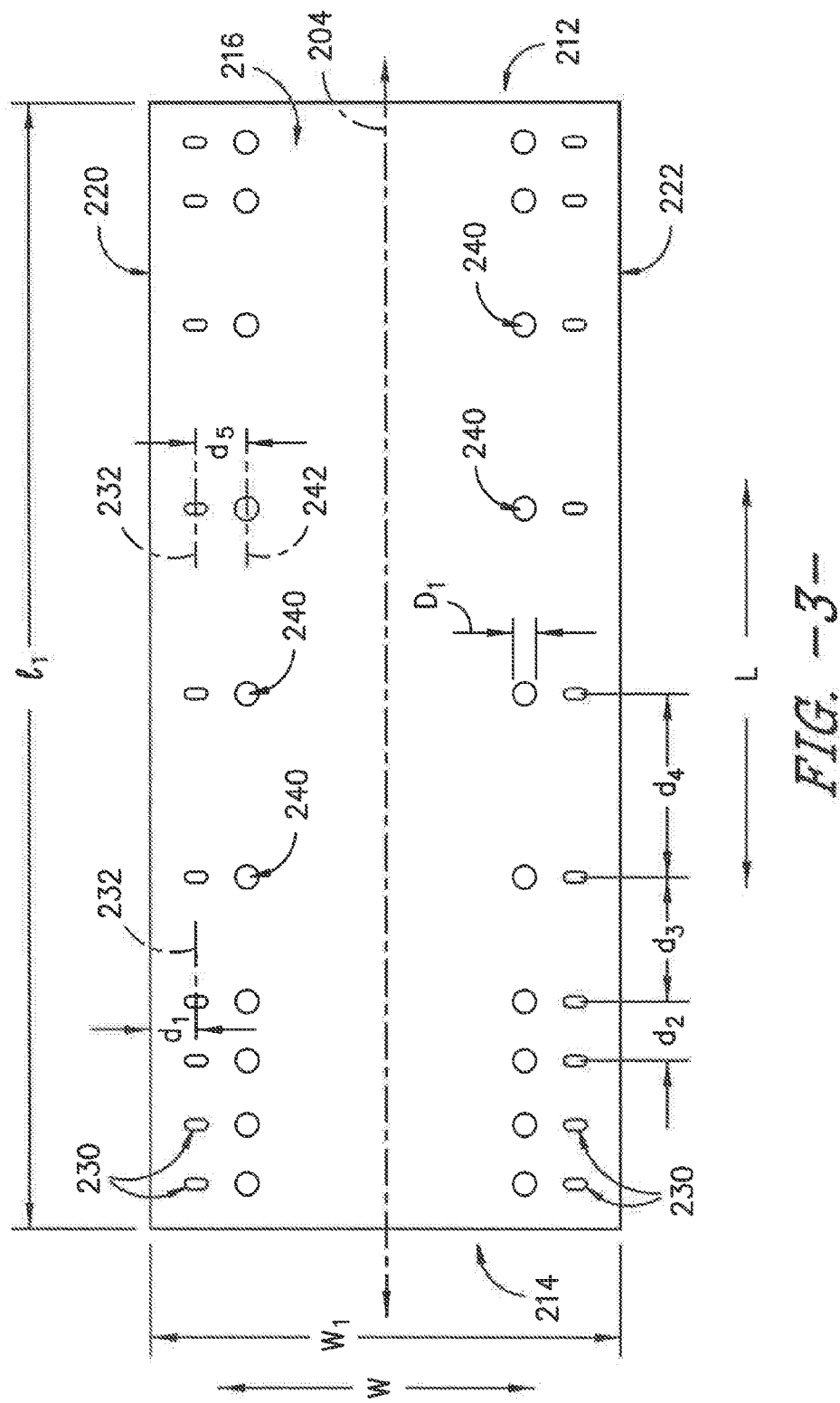
FIG. —3—

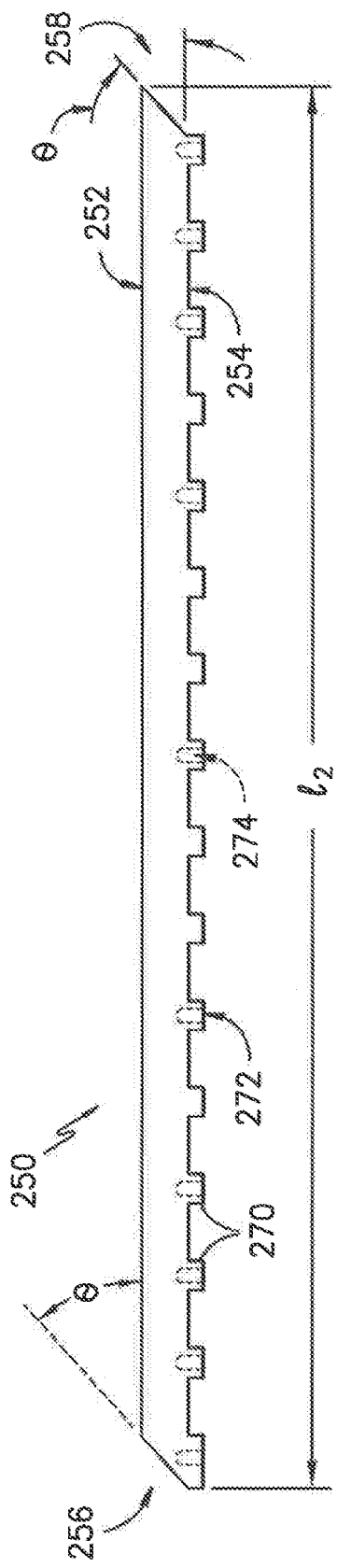
FIG. -4-
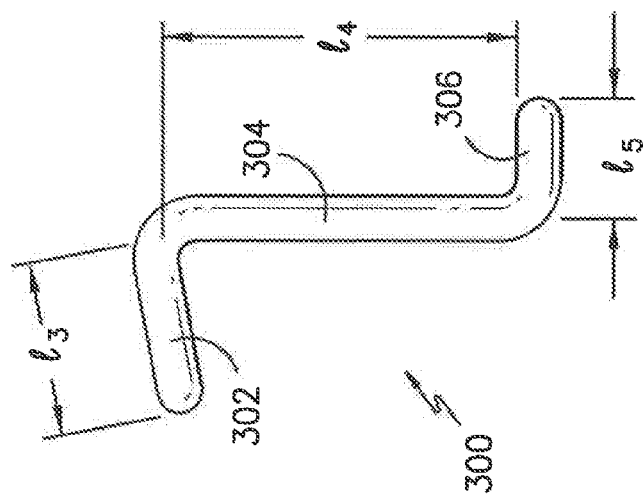
FIG. -5-

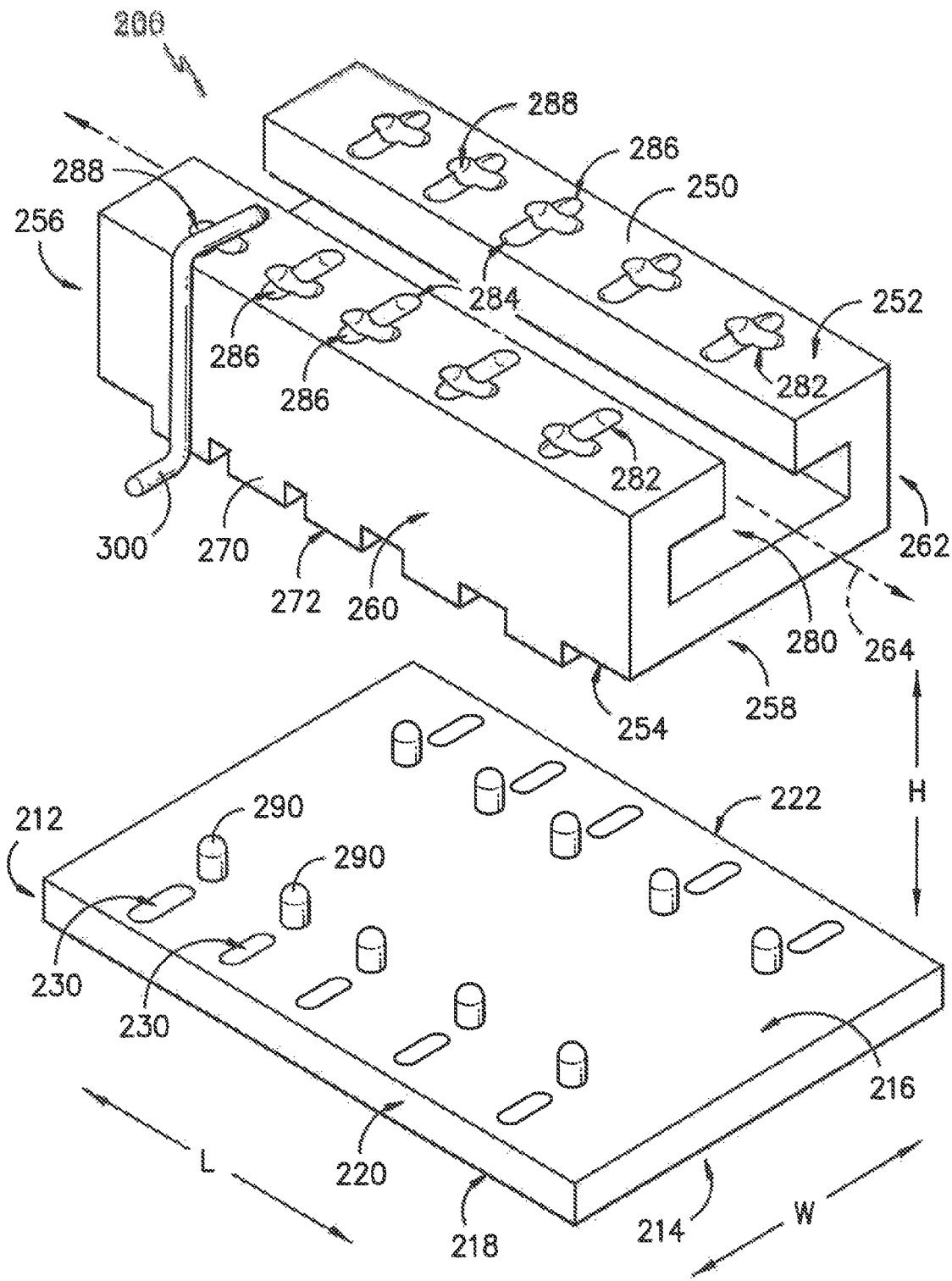
FIG. -6-

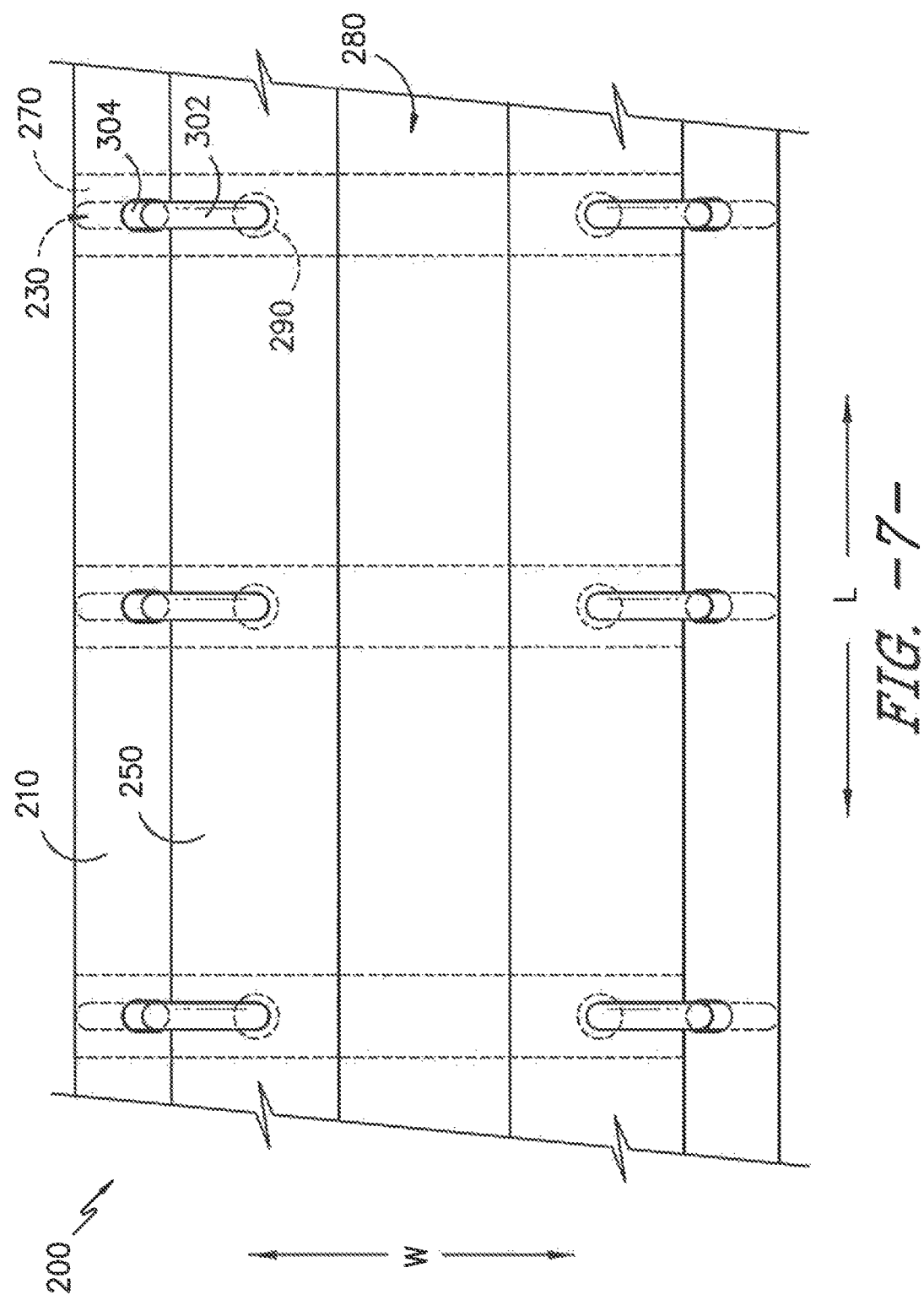
FIG. -7-

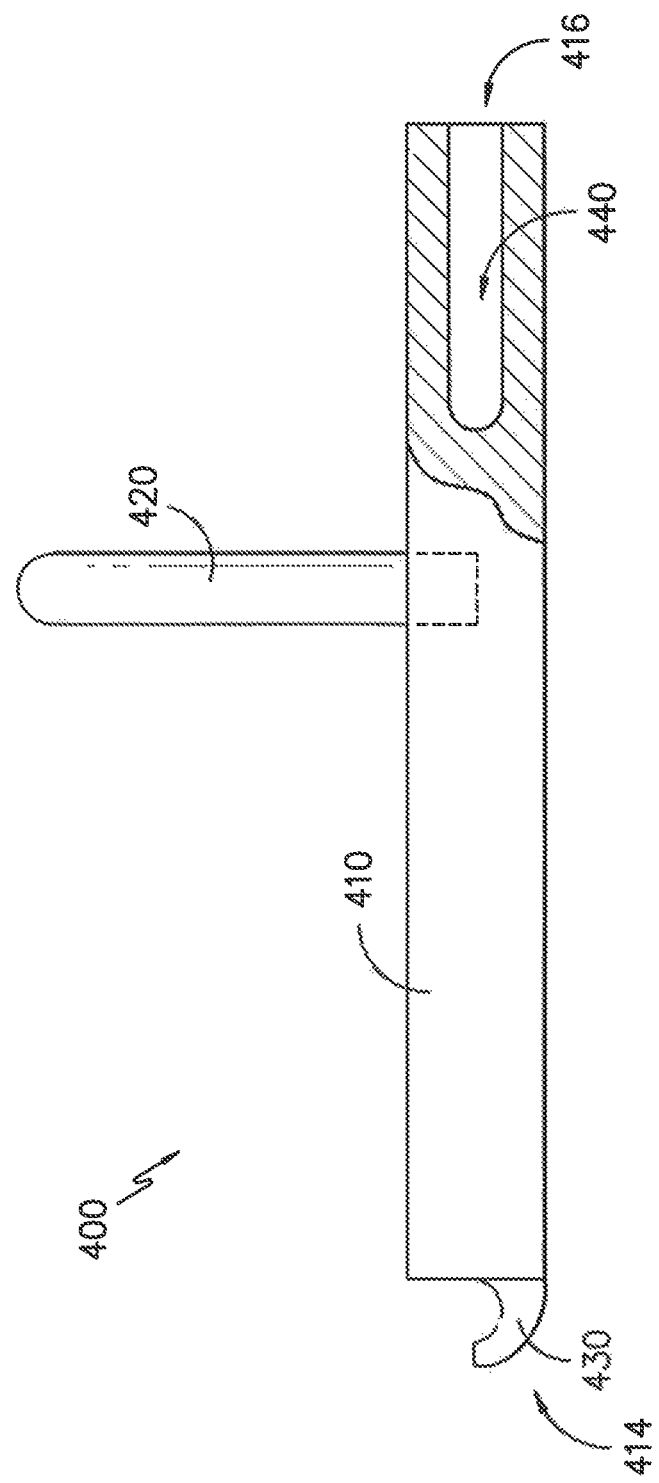

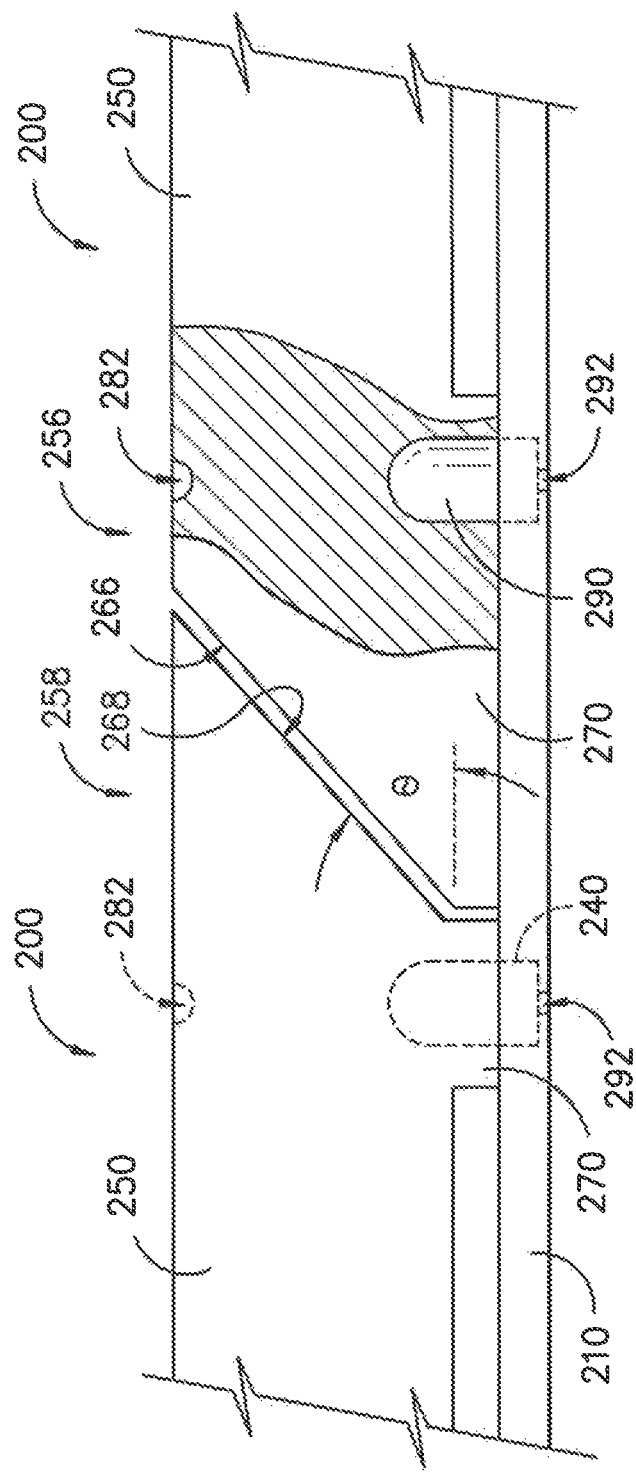
FIG. -9-

CONVEYOR TRACK ASSEMBLY FOR A MECHANICAL CHAIN

FIELD

The present subject matter generally involves conveyor assemblies and systems. More particularly, the present subject matter is directed to a conveyor track assembly section of multiple components.

BACKGROUND

Mechanical chain profiles are utilized in a variety of manufacturing processes to move goods or products throughout a production environment. Typical chain assembly systems utilize a wear track profile to provide a channel for a mechanical chain link to traverse. Generally, the wear track profiles are secured to a fixed structure utilizing various types of mechanical fasteners such as of screws and bolts. Often, the wear track profiles must be removed from their respective fixed location for preventative maintenance purposes and sanitation purposes. For example, in the poultry industry, when mechanical chains are used to convey products in a production environment, it is imperative for sanitation purposes that the mechanical chains and wear track profiles can easily be cleaned to comply with various government health and safety regulations. However, when the wear track profile is secured using screws or bolts, the process time to properly clean the conveyor track assembly and mechanical links can be lengthy. This can result in the production line being shut down for an extended period of time, which negatively impacts the production output of the manufacturing facility.

Accordingly, a need exists for an improved conveyor track assembly that may overcome one or more disadvantages of existing systems. For instance, an improved system may comprise assembly track sections in which a wear track profile is secured to a base plate through the use of removable/releasable springs so no bolts or screws are required. Alternatively, or in addition, an improved system may further utilize placement pins such that the wear track profile is further aligned and secured to the base plate when combined with the use of a spring.

BRIEF DESCRIPTION

Aspects and advantages of the invention will be set forth in part in the following description, or may be obvious from the description, or may be learned through practice of the invention.

In one aspect, the present subject matter is directed to a conveyor track assembly section for a mechanical chain. The conveyor track assembly section comprises a base plate, a wear track profile, and a z-spring. The z-spring comprises a first arm, a second arm, and a third arm. The first arm, the second arm, and the third arm form a Z shape. The z-spring secures the wear track profile to the base plate, and the mechanical chain is received within the wear track profile.

In another aspect, the present subject matter is directed to a conveyor track assembly section for a mechanical chain. The conveyor track assembly section comprises a base plate, a wear track profile, a plurality of placement pins, and a plurality of z-springs. Each z-spring comprises a first arm, a second arm, and a third arm. The first arm, the second arm, and the third arm of each z-spring form a Z shape. The plurality of z-springs secure the wear track profile to the base plate, and the plurality of placement pins align the wear track profile with the base plate. The mechanical chain is received within the wear track profile.

In a further aspect, the present subject matter is directed to a conveyor track assembly for a mechanical chain. The conveyor track assembly comprises a plurality of conveyor track assembly sections. Each conveyor track assembly section includes a base plate, a wear track profile, and a plurality of z-springs. Each z-spring comprises a first arm, a second arm, and a third arm. The first arm, the second arm, and the third arm of each z-spring form a Z shape. The plurality of z-springs secures the wear track profile to the base plate, and the mechanical chain is received within the wear track profile.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present subject matter, including the best mode thereof, directed to one of ordinary skill in the art, is set forth in the specification, which makes reference to the appended figures, in which:

FIG. 1 is a perspective view of a conveyor track assembly according to an exemplary embodiment of the present subject matter.

FIG. 2 is a cross section view of a conveyor track assembly section according to an exemplary embodiment of the present subject matter comprising a base plate, a wear track profile, a plurality of z-springs, and a plurality of placement pins.

FIG. 3 is a top view of the base plate of FIG. 2.

FIG. 4 is a side view of the wear track profile of FIG. 2,

FIG. 5 is a side perspective view of a z-spring of the plurality of z-springs of FIG. 2.

FIG. 6 is an exploded perspective view of the conveyor track assembly section of FIG. 2.

FIG. 7 is a top view of the conveyor track assembly section of FIG. 2.

FIG. 8 is a side view of a quick release tool used to detach and install a z-spring with respect to a conveyor track assembly section according to an exemplary embodiment of the present subject matter.

FIG. 9 is a side view of a combination of conveyor track assembly sections according to an exemplary embodiment of the present subject matter.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, terms such as "first," "second," and "third" may be used interchangeably to distinguish one component from another and are not intended to signify location or importance of the individual components.

Each example is provided by way of explanation of the invention, not limitation of the invention. In fact, it will be apparent to those skilled in the art that modifications and variations can be made to embodiments of the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

FIG. 1 provides a perspective view of a portion of a conveyor track assembly 100 according to an exemplary embodiment of the present subject matter. In the illustrated embodiment, two mechanical chains 110 form a conveyor to convey thereon items such as, e.g., empty or loaded boxes or the like. Each mechanical chain 110 is formed from a plurality of links 112 on which the items to be conveyed are placed. As shown in FIG. 1, the two mechanical chains 110 are positioned equidistant from each other throughout the conveyor track assembly 100. As will be readily understood, one, two, or more than two chains may be used to form a conveyor to convey items thereon. Further, the conveyor track assembly 100 comprises at least one conveyor track assembly section 200. Each conveyor track assembly section 200 includes a wear track profile 250 in which the mechanical chain 110 is received as it traverses a path through the conveyor assembly 100. The conveyor track assembly section 200 is described in greater detail below.

Within the depicted conveyor track assembly 100, mechanical chains 110 are supported on a support structure 120 that includes a plurality of vertical supports 122 and a plurality of horizontal supports 124. As shown in FIG. 1, the support structure 120 may also include one or more guide walls 126, e.g., to help guide items as they are conveyed by conveyor track assembly 100. Additionally, other components such as, e.g., a ramp 130 or slide 130 may be used in conveyor track assembly 100 to transfer items from one portion of the conveyor track assembly 100 to another portion of the conveyor track assembly 100.

As further illustrated in FIG. 1, mechanical chains 110 of conveyor track assembly 100 are driven by sprocket assembly 140 positioned at a drive end 102 of conveyor track assembly 100, with an idler assembly 142 positioned at a return end 104 of conveyor track assembly 100 to guide mechanical chains 110. Specifically, each mechanical chain 110 generally traverses a loop such that the links 112 of the mechanical chain 110 in an upper grouping of the loop are pulled by sprocket assembly 140 away from idler assembly 142 along a direction of movement M, with a portion of each mechanical chain 110 exposed for the placement of items thereon. Links 112 in a lower grouping of the loop are pushed toward idler assembly 142 in a direction opposite to the direction of movement M.

FIG. 2 provides a cross section view of an exemplary conveyor track assembly section 200 of the present subject matter. The conveyor track assembly section 200 defines a length direction L (FIG. 6), a width direction W, and a height direction H, which are orthogonal to one another. As shown, the conveyor track assembly section 200 comprises a base plate 210, a wear track profile 250, placement pins 290, and z-springs 300, which when assembled provide a path for the links 112 of the mechanical chain 110 to traverse. More particularly, as illustrated in FIG. 2, the mechanical chain 110 is received within the wear track profile 250 such that the links 112 of the chain 110 move along the wear track profile 250 as the chain 110 moves within the conveyor track assembly 100. Further, as described herein, the exemplary conveyor track assembly 200 section comprises a plurality of placement pins 290 and a plurality of z-springs 300. In some embodiments, the conveyor track assembly section 200 is symmetric across an assembly section center axis 202, which extends along the height direction H. Therefore, in such embodiments, there is an equivalent number of z-springs 300 and placement pins 290 on the left side and the right side of the first center axis 202. Each component is described in greater detail below.

FIG. 3 provides a top view of the base plate 210 shown in FIG. 2. Base plate 210 is defined dimensionally by a length $l_1$, a width $w_1$, and a height $h_1$ (FIG. 2). In the illustrated embodiment, the base plate 210 is a ¼ inch thick stainless steel plate; that is, height h1 is ¼ inch. However, one skilled in the art will appreciate the base plate also may be made from other suitable materials and may have a different height or thickness. Further, base plate 210 has a first end 212, a second end 214, a top surface 216, and a bottom surface 218 (FIG. 2). Between a first side surface 220 and a second side surface 222 and extending along the length direction L, the base plate 210 has a base plate center axis 204. In the illustrated embodiment, the base plate 210 is symmetric across the second center axis 204. As further described below, the symmetric design allows for an even distribution of forces across the base plate 210 in the conveyor track assembly 100.

Adjacent the first side surface 220, the base plate 210 defines a first row of slots 230. Each slot 230 in the row of slots is an opening that extends through the base plate 210 from the top surface 216 to the bottom surface 218. In the illustrated embodiment, each slot 230 has the same dimensions, which are dictated by the dimensions of z-springs 300. More particularly, each slot 230 must be large enough for a z-spring 300 to traverse through the opening for proper assembly of conveyor track assembly section 200, while also being small enough for z-spring 300 to remain in place once the conveyor track assembly section 200 is assembled. A widthwise center 232 of each slot 230 in the first row of slots is a distance $d_1$ from the first side surface 220. It can further be seen in FIG. 3 that the slots 230 are more condensed near the first end 212 and the second end 214 than a lengthwise central portion of the base plate 210. Because the first end 212 and the second end 214 experience the greatest forces and moments during use, the slots 230 near the ends 212, 214 are more condensed and, in the depicted embodiment, are spaced from one another at a distance $d_2$. As forces decrease toward the center, i.e., away from each of the first end 212 and second end 214, the slots 230 can be spaced from one another at larger and larger distances, such as the distances $d_3$ and $d_4$ in the exemplary embodiment. Similarly, as shown in FIG. 3, a symmetrical second row of slots 230 is defined adjacent the second side surface 222 of the base plate 210. Each slot 230 in the second row of slots is configured as described with respect to the slots 230 of the first row of slots.

The base plate 210 defines a hole 240 adjacent each slot 230. In the exemplary embodiment, each hole 240 receives a placement pin 290, as shown in FIG. 2. A center 242 of each hole 240 is located a widthwise distance $d_5$ from the center 232 of each slot 230. The diameter $D_1$ of each hole 240 is dictated by the diameter $D_2$ of the placement pins 290 (FIG. 2). As illustrated in FIG. 2, the depth or height $h_2$ of each hole 240 may be dictated by a desired height $h_3$ that the placement pin 290 extends above the top surface 216 of the base plate 210. In the depicted embodiment, the height $h_2$ of each of the holes 240 does not extend completely through the base plate 210, i.e., from the top surface 216 of the base plate 210 to the bottom surface 218 of the base plate 210, which permits a placement pin 290 to be received and secured in each hole 240 as will be described in further detail below.

FIG. 4 is a side view of the wear track profile 250 of the conveyor track assembly section 200 shown in FIG. 2. In exemplary embodiments, the wear track profile 250 is made of a single piece of ultra-high molecular weight polyethylene. However, one skilled in the art will appreciate that, in other embodiments, the wear track profile may consist of multiple components and/or be made from other suitable materials. The wear track profile 250 has a top surface 252, a bottom surface 254, a first end 256 opposite a second end 258 along the length direction L, and a first side 260 opposite a second side 262 along the width direction W. The wear track profile 250 has a length $l_2$ extending along the length direction L from the first end 256 and the second end 258. While the lengths length $l_1$ of the base plate 210 and length $l_2$ of the wear track profile 250 may be different in some embodiments, in the illustrated embodiment, each length $l_1$, $l_2$ is identical. Further, like the base plate 210, the wear track profile 250 is symmetric across a longitudinal or lengthwise center axis 264 (FIG. 6) that extends along the length direction L.

At least a portion of the first end 256 and the second end 258 of the wear track profile 250 with respect to the bottom surface 254 is biased at an angle. As shown in FIG. 4, a portion of the first end 256 is biased at an angle $\theta$ with respect to the top surface 252, and a portion of the second end 258 likewise is biased at angle $\theta$ with respect to the bottom surface 254 of the wear track profile 250, the top surface 252 and bottom surface 254 being parallel to one another. Angle $\theta$ is greater than 0°, and in some embodiments, angle $\theta$ may be within a range from about 30° to about 60°. In the illustrated embodiment, angle $\theta$ is about 45°, but the angle $\theta$ may have other values as well, up to about 90°. The angled first end 256 and angled second end 258 help prevent debris such as waste or contaminants from filling the gaps between conveyor track assembly sections 200, as well as help transition between uneven surfaces and bends or curves in the conveyor track assembly 100.

As shown in FIG. 4, the bottom surface 254 of the wear track profile includes a plurality of ribs 270. Each rib of the plurality of ribs 270 extends from the bottom surface 254 of the wear track profile 250 and has a height $h_4$. Further, each rib 270 comprises a width $w_2$ (FIG. 7) and extends the entire width $w_3$ (FIG. 2) of the wear track profile 250. The bottom surface 272 of each rib 270 defines at least one hole 274 that receives a corresponding placement pin 290 secured to the base plate 210. Therefore, each hole 274 in the wear track profile 250 corresponds to a hole 240 in the base plate 210, such that a first row of holes 274 and a second row of holes 274 are defined in the plurality of ribs 270. As illustrated in FIG. 2, the placement pins 290 secured within the plurality of holes 240 of the base plate 210 thereby are received in the corresponding hole 274 on the wear track profile 250. As such, the plurality of placement pins 290 aligns the wear track profile 250 and the base plate 210 and prevents the wear track profile 250 from shifting on the base plate 210 when the conveyor track assembly 100 is in operation.

In exemplary embodiments, the shape of each hole 274 is complementary to the shape of each placement pin 290, but the holes 274 may have any suitable shape for receipt of placement pins 290. Further, the diameter $D_3$ of each hole 274 is large enough to receive a placement pin 290 but also small for the placement pin 290 to snugly fit within the hole 274. It will also be appreciated by one skilled in the art that in other embodiments, the bottom surface 254 of the wear track profile 250, rather than ribs 270, may define the holes 274 that receive corresponding placement pins 290 that are secured to the base plate 210.

In the illustrated embodiment, the ribs 270 are equally spaced along the length direction L from the first end 256 to the second end 258, but like the holes 240 defined in the base plate 210, the holes 274 in the first row of holes 274 are not equally spaced from one another and the number of holes 274 in the second row of holes are not evenly spaced from one another along the length direction L. Accordingly, in the embodiment depicted in FIG. 4, the number of ribs 270 differs from the number of holes 274 in the first row of holes and from the number of holes 274 in the second row of holes. It will be appreciated that, in other embodiments, a hole 274 in the first row of holes is defined in each rib 270 and a hole 274 in the second row of holes is defined in each rib 270 such that the number of holes 274 in the first row of holes and the number of holes 274 in the second row of holes 274 corresponds to the number of ribs 270.

Additionally, as shown in FIG. 6, the center of the wear track profile 250 defines a cutout 280 corresponding to the shape of the mechanical chain 110. The cutout 280 extends the entire length $l_2$ of the wear track profile 250, and the cutout 280 remains consistent across each conveyor track assembly section 200 of the conveyor track assembly 100. It will be appreciated by one skilled in the art that the shape of cutout 280 may be adapted for various types of mechanical chains 110 that may be used with the conveyor assembly 100 for a variety of applications.

FIG. 5 provides a side view of a z-spring 300 illustrated in FIG. 2. As shown in FIG. 5, z-spring 300 comprises a first arm 302, a second arm 304, and a third arm 306. The arms together form a Z shape and provide stiffness to secure the wear track profile 250 to the base plate 210. The first arm 302 has a length $l_3$, the second arm 304 has a length $l_4$, and the third arm 306 has a length $l_5$.

FIG. 6 provides an exploded perspective view and FIG. 7 provides a top view of a portion of the conveyor track assembly section 200 depicted in FIG. 2, which comprises the components depicted in FIG. 3-5. Although only one z-spring 300 is depicted in FIG. 6, it will be appreciated that a z-spring 300 extends through each slot 230 in the base plate 210 such that the first arm 302 is positioned on the top surface 252 of the wear track profile 250 and the third arm 306 is positioned on the bottom surface 218 of the base plate 210 as further described herein. A plurality of z-springs 300 are shown in FIG. 7.

As illustrated in FIG. 6, the placement pins 290 are secured in the holes 240 in the base plate 210. The placement pins 290 may be made from stainless steel or another suitable material and, in exemplary embodiments, are welded into the holes 240. For example, the base plate 210 may define a recess 292 (FIGS. 2, 9) adjacent each hole 240 that provides an area for placement pins 290 to be welded to the base plate 210 within the holes 240. However, one skilled in the art will appreciate that the placement pins 290 may be secured to the base plate 210 using other suitable methods.

The holes 274 defined by the wear track profile 250, e.g., in ribs 270 as shown in the depicted embodiment, correspond to the placement pins 290 on the base plate 210. Therefore, the first end 212 and second end 214 of the base plate 210 align with the first end 256 and second end 258 of the wear track profile 250. The placement pins 290 received in the wear track profile 250 permit proper alignment of wear track profile 250 and base plate 210 and prevent the wear track profile 250 from shifting during operation of the conveyor track assembly 100.

Further, as generally designated in FIG. 6, the top surface 252 of the wear track profile defines a first row of grooves 282 and a second row of grooves 282 spaced laterally apart from the first row. Each groove 282 in the first and second rows of grooves 282 is defined directly above a hole 274 defined in the wear track profile 250. As illustrated in FIGS. 6 and 7, each groove 282 receives the first arm 302 of a z-spring 300, and the grooves 282 may be tapered in depth, as most clearly illustrated in FIG. 2. That is, each groove 282 has a first end 284 that is deeper than an opposite second end 286. In the depicted embodiment, the first ends 284 of the grooves 282 are defined toward the center of the wear track profile 250. As such, as shown in FIG. 6 for example, the second ends 286 of the grooves 282 in the first row of grooves are defined closer to the first side 260 of the wear track profile 250 and the second ends 286 of the grooves 282 in the second row of grooves are defined closer to the second side 262 of the wear track profile.

Thus, the first arm 302 of each z-spring 300 of the conveyor track assembly section 200 contacts the top surface 252 of the wear track profile 250. Further, the first arm 302 of each z-spring 300 is directly above a placement pin 290 as shown in FIGS. 2 and 7. The second arm 304 of each z-spring 300 extends through a corresponding slot 230 in the base plate 210, and the third arm 306 of each z-spring 300 contacts the bottom surface 218 of base plate 210.

When a z-spring 300 is installed in each slot 230 with the first and third arms 302, 306 contacting the wear track profile 250 and base plate 210, respectively, the conveyor track assembly section 200 is fully assembled without the need for hardware such as screws or bolts. The illustrated embodiment allows for easier assembly and disassembly of conveyor track assembly section 200, which, e.g., decreases the amount of time required to properly clean and sanitize the conveyor track assembly 100 when required. Further, the placement of each z-spring 300 above a placement pin 290 contributes to the structural integrity of the conveyor track assembly section 200. The z-spring 300 compresses the wear track profile 250 over the base plate 210 and placement pins 290, and further prevents the wear track profile 250 from shifting or moving during operation of the conveyor track assembly 100.

FIG. 8 is an example of a release tool 400 that can be used to install the z-springs 300 with the wear track profile 250 and base plate 210 and to detach the z-springs 300 from wear track profile 250 and base plate 210 so the conveyor track assembly sections 200 can be assembled and disassembled. The release tool 400 includes a shaft 410 with a handle 420 extending from the shaft 410. A first end 414 of the release tool 400 comprises a hook 430 that fits in release holes 288 shown in FIGS. 2 and 6. The release holes 288 are defined at each groove 282 on the top surface 252 of the wear track profile 250 to permit the hook 430 of the release tool 400 to be inserted under the z-spring 300 such that when the hook 430 is lifted upward or rotated within the release hole 288, the z-spring 300 may be released from groove 282 and thereby detached or removed from the conveyor track assembly section 200. A second end 416 of the release tool 400 defines a slot 440 that allows assembly of the z-spring 300 with the wear track profile 250 and base plate 210. More particularly, the first arm 302 or third arm 306 of a z-spring 300 fits in the release tool slot 440, and the release tool 400 is rotated to position the arm of the z-spring 300 in place with respect to the wear track profile 250 or base plate 210.

It will be appreciated that the z-springs 300 may apply a relatively large amount of pressure (90 pounds per square inch) to the wear track profile 250 and base plate 210 to properly assemble the profile 250 and plate 210 to form the conveyor track assembly section 200. As such, the release tool 400 may allow easier assembly and/or disassembly of conveyor track assembly sections 200. For example, the release tool 400 may make it possible to install and detach the z-springs 300, which may apply too great of a pressure to allow for assembly and disassembly by hand. As another example, the release tool 400 may reduce the amount of time it takes to assemble the wear track profile 250 with the base plate 210 or to remove the profile 250 from the plate 210.

FIG. 9 provides a side view of two conveyor track assembly sections 200 positioned adjacent one another at their ends to form a portion of the conveyor track assembly 100. As previously described, at least a portion of each end 256, 258 of a wear track profile 250 may be angled with respect to the bottom surface 254 of the wear track profile. The angled portion of the first end 256 defines a first angled surface 266, and the angled portion of the second end 258 defines a second angled surface 268. As shown in FIG. 9, when the conveyor track assembly sections 200 are positioned end-to-end, the first angled surface 266 of one conveyor track assembly section 200 aligns with a second angled surface 268 of a second conveyor track assembly section 200. In the illustrated embodiment, because the first end 256 and first angled surface 266 and the second end 258 and second angled surface 268 are at the same angle θ, a gap G between the conveyor track assembly sections 200 may be minimized. Therefore, less debris enters the gap G, which enables easier cleaning and sanitation of the conveyor track assembly 100. Further, the angled first and second ends 256, 258 help the plurality of conveyor track assembly sections 200 transition between uneven surfaces and bends or curves in the conveyor track assembly 100. That is, the angled interface between conveyor track assembly sections 200 may be better for more complicated configurations of the conveyor track assembly 100 than an essentially vertical interface between sections 200 by better enabling transitions while also minimizing gaps between sections 200.

It also will be appreciated that the base plates 210 may be configured to secure one or more wear track profiles 250 to each base plate 210. For example, the base plate 210 may secure two wear track profiles 250 using the structure detailed above. Similarly, the base plate 210 sizes may be altered so the gaps between base plates 210 occur in the midpoints of the wear track profiles 250. Further, it can be appreciated by one skilled in the art that the base plate may define additional holes, slots, grooves, etc. to mount the base plate 210 to the support structure 120 of the conveyor track assembly 100.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they include structural elements that do not differ from the literal language of the claims or if they include equivalent structural elements with insubstantial differences from the literal language of the claims.

What is claimed is:

1. A conveyor track assembly section for a mechanical chain, comprising:

a base plate;

a wear track profile; and a z-spring comprising a first arm, a second arm, and a third arm, wherein the first arm, the second arm, and the third arm form a Z shape, wherein the z-spring secures the wear track profile to the base plate, and wherein the mechanical chain is received within the wear track profile.

2. The conveyor track assembly section of claim 1, wherein the wear track profile is made of ultra-high molecular weight polyethylene.

3. The conveyor track assembly section of claim 1, wherein the wear track profile has a top surface and a bottom surface, the top surface having at least one groove, and wherein the first arm of the z-spring is received in the groove to secure the wear track profile to the base plate.

4. The conveyor track assembly section of claim 1, wherein the wear track profile has a top surface and a bottom surface, wherein the top surface and the bottom surface are connected by at least one end surface, and wherein the at least one end surface is at an angle $\theta_1$ with respect to the bottom surface of the wear track profile.

5. The conveyor track assembly section of claim 1, wherein the base plate has a row of slots, each slot in the row of slots extending through the base plate from a top surface of the base plate to a bottom surface of the base plate.

6. The conveyor track assembly section of claim 5, wherein the z-spring is one of a plurality of z-springs, and wherein each z-spring traverses through a slot in the row of slots to secure the wear track profile to the base plate.

7. A conveyor track assembly section for a mechanical chain, comprising:

a base plate;

a wear track profile;

a plurality of placement pins; and a plurality of z-springs, each z-spring comprising a first arm, a second arm, and a third arm, wherein the first arm, the second arm, and the third arm of each z-spring form a Z shape, wherein the plurality of z-springs secure the wear track profile to the base plate, wherein the plurality of placement pins align the wear track profile with the base plate, and wherein the mechanical chain is received within the wear track profile.

8. The conveyor track assembly section of claim 7, wherein the wear track profile has a top surface and a bottom surface, wherein the top surface and the bottom surface are connected by at least one end surface, and wherein the at least one end surface is at an angle $\theta_1$ with respect to the bottom surface of the wear track profile.

9. The conveyor track assembly section of claim 7, wherein the base plate has a row of slots, each slot in the row of slots extending through the base plate from a top surface of the base plate to a bottom surface of the base plate, and wherein the base plate defines a hole adjacent each slot in the row of slots.

10. The conveyor track assembly of claim 9, wherein a placement pin of the plurality of placement pins is secured within each hole in the base plate such that the plurality of placement pins extend above the top surface of the base plate.

11. The conveyor track assembly section of claim 10, wherein the wear track profile defines a plurality of holes on a bottom surface of the wear track profile, each hole in the bottom surface of the wear track profile configured for receipt of one of the plurality of placement pins that extend above the top surface of the base plate.

12. The conveyor track assembly section of claim 11, wherein the first arm of each z-spring of the plurality of z-springs is positioned on a top surface of the wear track profile at a location above a placement pin of the plurality of placement pins, wherein the second arm of each z-spring of the plurality of z-springs traverses through a slot in the row of slots in the base plate, and wherein the third arm of each z-spring of the plurality of z-springs is in contact with the bottom surface of the base plate.

13. The conveyor track assembly section of claim 11, wherein a plurality of ribs extend from the bottom surface of the wear track profile, and wherein the plurality of holes of the wear track profile is defined in the plurality of ribs.

14. The conveyor track assembly section of claim 9, wherein the wear track profile has a top surface, wherein the top surface of the wear track profile defines a row of grooves, and wherein the row of grooves is parallel to the row of slots of the base plate.

15. The conveyor track assembly section of claim 14, wherein the first arm of each z-spring of the plurality of z-springs is received in a groove in the row of grooves to secure the wear track profile to the base plate.

16. A conveyor track assembly for a mechanical chain, comprising:

a plurality of conveyor track assembly sections, each conveyor track assembly section including:

a base plate;

a wear track profile; and a plurality of z-springs, each z-spring comprising a first arm, a second arm, and a third arm, wherein the first arm, the second arm, and the third arm of each z-spring form a Z shape, wherein the plurality of z-springs secure the wear track profile to the base plate and wherein the mechanical chain is received within the wear track profile.

17. The conveyor track assembly of claim 16, wherein each wear track profile has a top surface and a bottom surface, wherein the top surface and the bottom surface are connected by a first end surface and a second end surface, and wherein each of the first end surface and the second end surface is at an angle $\theta_1$ with respect to the bottom surface of the wear track profile.

18. The conveyor track assembly of claim 17, wherein the second end surface of each wear track profile interfaces with a first end surface of an adjacent wear track profile.

19. The conveyor track assembly of claim 18, wherein the base plate has a row of slots, each slot in the row of slots extending through the base plate from a top surface of the base plate to a bottom surface of the base plate, wherein the base plate defines a hole adjacent each slot in the row of slots, wherein each conveyor track assembly section further comprises a plurality of placement pins, wherein a placement pin of the plurality of placement pins is secured within each hole in the base plate such that the plurality of placement pins extend above the top surface of the base plate, wherein the wear track profile has a plurality of ribs extending from the bottom surface of the wear track profile, wherein the wear track profile defines a plurality of holes in the plurality of ribs for receipt of the plurality of placement pins that extend above the top surface of the base plate, wherein the top surface of the wear track profile defines a row of grooves, wherein the row of grooves is parallel to the row of slots of the base plate, wherein the first arm of each z-spring of the plurality of z-springs is received in a groove of the row of grooves, wherein the second arm of each z-spring of the plurality of z-springs traverses through a slot in the row of slots, and wherein the third arm of each z-spring of the plurality of z-springs is in contact with the bottom surface of the base plate.

20. The conveyor track assembly of claim 19, wherein the top surface of the wear track profile defines a release hole at each groove of the row of grooves, and wherein a release tool is configured to fit within the release hole to remove the z-springs from the conveyor track assembly.

* * * * *